United States Patent
Gutperl et al.

(10) Patent No.: US 9,533,257 B2
(45) Date of Patent: Jan. 3, 2017

(54) METHOD OF AND A SCRUBBER FOR REMOVING POLLUTANT COMPOUNDS FROM A GAS STREAM

(71) Applicant: AMEC FOSTER WHEELER ENERGIA OY, Espoo (FI)

(72) Inventors: Winfried Gutperl, Burghaun (DE); Rolf Graf, Friedrichsdorf (DE); Harald Kessler, Bad Homburg (DE); Reijo Kuivalainen, Varkaus (FI)

(73) Assignee: AMEC FOSTER WHEELER ENERGIA OY, Espoo (FI)

( * ) Notice: Subject to any disclaimer, the term of this patent is extended or adjusted under 35 U.S.C. 154(b) by 0 days.

(21) Appl. No.: 15/110,949

(22) PCT Filed: Jan. 31, 2014

(86) PCT No.: PCT/EP2014/051946
§ 371 (c)(1),
(2) Date: Jul. 12, 2016

(87) PCT Pub. No.: WO2015/113628
PCT Pub. Date: Aug. 6, 2015

(65) Prior Publication Data
US 2016/0332117 A1    Nov. 17, 2016

(51) Int. Cl.
*B01J 8/18*     (2006.01)
*B01J 8/24*     (2006.01)
(Continued)

(52) U.S. Cl.
CPC ............... *B01D 53/83* (2013.01); *B01D 53/12* (2013.01); *B01D 53/508* (2013.01);
(Continued)

(58) Field of Classification Search
CPC ............. B01J 8/00; B01J 8/0055; B01J 8/008; B01J 8/18; B01J 8/1863; B01J 8/1872; B01J 8/24; B01J 8/38; B01J 8/388; B01J 2208/00752; B01J 2208/00938; B01J 2208/00796; B01D 53/12; B01D 53/1456; B01D 53/40; B01D 53/508; B01D 53/685; B01D 53/83

See application file for complete search history.

(56) References Cited

U.S. PATENT DOCUMENTS 4,065,271 A * 12/1977 Weckesser ............. B01D 53/68
                                                              95/108
4,191,544 A   3/1980 Boll et al.
(Continued)

FOREIGN PATENT DOCUMENTS

CN    101402019 A    4/2009
CN    201760230 U    3/2011
(Continued)

OTHER PUBLICATIONS

Notification of and International Preliminary Report on Patentability mailed Jul. 13, 2016, in corresponding International Patent Application No. PCT/EP2014/051946.
(Continued)

*Primary Examiner* — Timothy Vanoy
(74) *Attorney, Agent, or Firm* — Fitzpatrick, Cella, Harper & Scinto (57) ABSTRACT

A scrubber for removing pollutant compounds from a gas stream. At least one gas channel introduces the gas stream to a lower portion of the scrubber. An inlet chamber directs the gas stream upwards to form a vertical gas stream. A constriction section has a vertical axis of symmetry and includes a centrally arranged venturi nozzle, and is above and in flow connection with an upper end of the inlet chamber for accelerating the vertical gas stream. A reaction chamber is arranged above and in flow connection with the constriction (Continued)

section. A reagent in the reaction chamber converts pollutant compounds in the gas stream to reaction products. A discharge channel in flow connection with the reaction chamber discharges gas and particles including the reaction products from the reaction chamber. A particle separator separates particles from the gas. A return channel recycles a portion of the particles to the reaction chamber.

18 Claims, 4 Drawing Sheets

(51) Int. Cl.
    *B01J 8/32*     (2006.01)
    *B01D 53/12*     (2006.01)
    *B01D 53/38*     (2006.01)
    *B01D 53/83*     (2006.01)
    *B01D 53/68*     (2006.01)
    *B01D 53/50*     (2006.01)

(52) U.S. Cl.
    CPC ...... *B01D 53/685* (2013.01); *B01D 2251/404* (2013.01); *B01D 2251/604* (2013.01); *B01D 2257/2045* (2013.01); *B01D 2257/2047* (2013.01); *B01D 2257/302* (2013.01)

(56) References Cited

U.S. PATENT DOCUMENTS

| | | | | |
|---|---|---|---|---|
| 4,548,797 A | * | 10/1985 | Sauer | B01D 53/12 423/240 R |
| 4,747,852 A | * | 5/1988 | Engstrom | B01D 45/12 422/145 |
| 4,813,380 A | * | 3/1989 | Engstrom | B01J 8/388 110/245 |
| 5,382,418 A | * | 1/1995 | Thone | B01D 53/12 423/239.1 |
| 5,665,130 A | | 9/1997 | Nielsen et al. | |
| 6,290,921 B1 | * | 9/2001 | Kuivalainen | B01D 53/346 423/210 |
| 8,883,082 B1 | * | 11/2014 | Quitadamo | B01D 53/508 422/139 |
| 9,040,004 B2 | * | 5/2015 | Sauer | B01D 53/508 423/210 |
| 2006/0228281 A1 | * | 10/2006 | Stroder | B01D 53/12 423/212 |
| 2012/0237423 A1 | * | 9/2012 | Bialkin | B01D 53/346 423/240 R |
| 2015/0093295 A1 | * | 4/2015 | Quitadamo | B01D 53/508 422/139 |
| 2016/0089631 A1 | * | 3/2016 | Zhu | B01D 53/56 423/239.1 |

FOREIGN PATENT DOCUMENTS

| | | |
|---|---|---|
| EP | 0 200 695 A1 | 11/1986 |
| EP | 0 575 245 A1 | 12/1993 |
| EP | 0 995 479 A1 | 4/2000 |
| WO | 00/61263 A1 | 10/2000 |
| WO | 2005/030368 A1 | 4/2005 |
| WO | 2006/032288 A1 | 3/2006 |

OTHER PUBLICATIONS

Notification of and International Search Report and Written Opinion mailed Oct. 6, 2014, in corresponding International Application No. PCT/EP2014/051946.
Written Opinion of the International Preliminary Examining Authority mailed Apr. 15, 2016, in corresponding International Application No. PCT/EP2014/051946.

* cited by examiner

Fig. 1

PRIOR ART

METHOD OF AND A SCRUBBER FOR REMOVING POLLUTANT COMPOUNDS FROM A GAS STREAM

CLAIM OF PRIORITY

This application is a U.S. national stage application of PCT International Application No. PCT/EP2014/051946, filed Jan. 31, 2014.

BACKGROUND OF THE INVENTION

Field of the Invention

The present invention relates to a method of and a scrubber for removing pollutant compounds from a gas stream. More particularly, the present invention relates to dry circulating fluidized bed (CFB) scrubbers, used for removing pollutants, such as $SO_2$, HCl and HF, from a stream of exhaust gas.

Description of Related Art

Dry CFB scrubbers are well-known systems for removing pollutants, especially, acid gases, from a pollutant laden gas stream, such as exhaust gas emanating from a combustion boiler. Dry CFB scrubbers generally comprise a gas channel for introducing the gas stream to a lower portion of the scrubber, an inlet chamber at the lower portion of the scrubber for directing the gas stream upwards, a constriction section arranged above the inlet chamber for accelerating the gas, a reaction chamber arranged above the constriction section, means for introducing at least one reagent to the reaction chamber for converting pollutant compounds in the gas stream to reaction products, a discharge channel for discharging gas and particles including the reaction products from the reaction chamber, a particle separator for separating particles including the reaction products from the gas, and a return channel for recycling a portion of the separated particles from the particle separator to the reaction chamber.

The reagent used in dry CFB scrubbers, especially, when removing $SO_2$, $SO_3$, HCl and HF from exhaust gas, is usually an alkaline material, such as hydrated lime $Ca(OH)_2$, CaO, $CaCO_3$, and $NaHCO_3$. Especially, when removing pollutants like mercury, dioxins or furans, existing in low concentrations in some flue gases, other reagents, such as powdered activated carbon, lignite coke or bentonite, can also be introduced into the scrubber system.

The reagent can be injected into different locations, for example, in the combustion process, in the exhaust gas duct upstream of the scrubber, directly into the reaction chamber of the scrubber or into the return channel. The pollutant compounds in the gas stream react with the reagent material to form reaction products, generally solid salts, which are removed from the gas in the particle separator, usually a fabric filter.

Water is usually also injected into the reaction chamber to control temperature and humidity therein, for example, to enhance the reaction of $SO_2$ with $Ca(OH)_2$. In dry scrubbing systems, however, unlike in wet scrubbers, the gas stream that is being treated is not saturated with moisture. To the contrary, only the amount of moisture that can be evaporated in the exhaust gas without condensing is added.

The reaction chamber of a dry CFB scrubber comprises a bed of particulate material, consisting mainly of fly ash and reagent particles, fluidized by a vertical stream of pollutant laden gas. The reaction between the reagent and the pollutant compounds takes place mostly on the surface of the bed particles, mainly in the reaction chamber. In order to maintain the bed in the reaction chamber, usually, a portion of the material collected by the particle separator is recycled back to the reaction chamber.

In a commonly used construction, shown, for example, in the patent document International Publication No. WO 2005/030368, recycled material is introduced from a bottom hopper of the particle separator through a sloping recycling channel and a feeding nozzle to a side of an expanding, downstream portion of the vertical constriction section arranged above the inlet chamber. This solution has the disadvantage that because the feeding nozzle is at a relatively high vertical level in the scrubber, the total height of the scrubber system becomes relatively large.

International Publication No. WO 2006/032288 discloses another construction in which the height of the scrubber system is decreased by connecting the recycling channel by a feeding nozzle to a side wall of the inlet chamber, upstream of the constriction section. This solution has the disadvantage that because the velocity of the gas stream in the inlet chamber may be relatively low, especially near the location of the feeding nozzle, a too large portion of the recycled particles tends to sink to the bottom of the inlet chamber, especially at low loads. This effect can be minimized by recycling gas to the bottom of the inlet chamber, which, however, makes the system complicated and increases the costs.

Chinese Patent Document Nos. CN 201760230 and CN 101402019 show a dry fluidized bed desulfurization reactor comprising a sloped channel for conveying absorbent particles to an absorbent distributor at a central zone of an inlet chamber, at the vertical axis of a constriction section comprising multiple circumferentially arranged venturi nozzles. Even with these solutions, the recycled particles are introduced to the inlet chamber at a zone in which the gas velocity is relatively slow and the entrainment of particles and their distribution to the reaction chamber may be less than optimal.

An object of the present invention is to provide a method of and a scrubber for removing pollutant compounds from a gas stream in which at least some of the problems of the prior art mentioned above are minimized.

SUMMARY OF THE INVENTION

According to one aspect, the present invention provides a scrubber for removing pollutant compounds from a gas stream, comprising at least one gas channel for introducing the gas stream to a lower portion of the scrubber, an inlet chamber at the lower portion of the scrubber for directing the gas stream upwards to form a vertical gas stream, a constriction section having a vertical axis of symmetry and comprising a centrally arranged venturi nozzle, the constriction section being above and in flow connection with an upper end of the inlet chamber for accelerating the vertical gas stream, a reaction chamber arranged above and in flow connection with the constriction section, means for introducing at least one reagent to the reaction chamber for converting pollutant compounds in the gas stream to reaction products, a discharge channel in flow connection with the reaction chamber for discharging gas and particles including the reaction products from the reaction chamber, a particle separator in flow connection with the discharge channel for separating particles including the reaction products from the gas, and a return channel for continuously recycling a portion of the separated particles from the particle separator to the reaction chamber, wherein the return channel comprises a vertical end section arranged annularly around the centrally arranged venturi nozzle, a lower end of the vertical end section being in flow connection with the inlet chamber so as to distribute recycled particles evenly to a zone adjacent to the lower end of the centrally arranged venturi nozzle to entrain a fine fraction of the recycled particles with the vertical gas stream and to separate a coarse fraction of the recycled particles to a lower portion of the inlet chamber.

According to another aspect, the present invention provides a method of removing pollutant compounds from a gas stream in a scrubber, comprising the steps of introducing the gas stream through at least one gas channel to an inlet chamber at a lower portion of the scrubber, directing the gas stream upwards in the inlet chamber to form a vertical gas stream, accelerating the vertical gas stream in a constriction section arranged above and in flow connection with the inlet chamber, the constriction section having a vertical axis of symmetry and comprising a centrally arranged venturi nozzle, conveying the gas stream from the constriction section to a reaction chamber arranged above the constriction section, introducing at least one reagent to the reaction chamber for converting the pollutant compounds to particulate reaction products, discharging gas and particles including the reaction products through a discharge channel from the reaction chamber to a particle separator, separating particles including the reaction products from the gas in the particle separator, recycling a portion of the separated particles from the particle separator through a return channel to the reaction chamber, and distributing the recycled particles evenly through a vertical end section of the return channel arranged annularly around the centrally arranged venturi nozzle to a zone adjacent the lower end of the centrally arranged venturi nozzle to entrain a fine fraction of the recycled particles with the vertical gas stream and to separate a coarse fraction of the recycled particles to a lower portion of the inlet chamber. The steps of the method may be performed continuously.

An important feature of the present invention is that the recycled particles are not released at a side wall of the inlet chamber, but at a portion that is central with respect to the axis of symmetry of the constriction section. Thereby, the particles can be released evenly or symmetrically with respect of the constriction section.

The releasing location of the particles and their distribution to the gas stream are important for optimal functioning of the scrubber. If the particles were released on the side or at a lower portion of the inlet chamber, the particles could be affected by a gas stream, which has a relatively low velocity and possibly unstable direction, and the heat transfer to the particles and their entrainment with the gas would not be effective. Non-symmetrical releasing of the particles also increases the risk that the fluidized bed forming in the reaction chamber becomes non-symmetrical. This decreases the efficiency of the removal of pollutants, and may even cause that the bed does not stay in the reaction chamber, but falls down to the inlet chamber.

The present invention relates to scrubbers having a constriction section with a centrally arranged venturi nozzle. A venturi nozzle is a well-known flow velocity changing component, which has a variable cross-sectional area. The horizontal cross section of a vertical venturi is convergent or upwards decreasing in a lower portion of the venturi and divergent or upwards increasing in an upper portion of the venturi. Thereby, the velocity of the vertical gas stream accelerates at the lower portion of the venturi. The shape of the venturi is advantageously streamlined so as to avoid any sharp edges that could cause turbulence or even dead spaces in the flow path.

The centrally arranged venturi nozzle may be the sole venturi nozzle of a relatively small scrubber, which comprises only one venturi nozzle, or a central venturi nozzle of a larger scrubber comprising multiple venturi nozzles. It is to be noted that the scrubbers disclosed, for example, in Chinese Patent Document Nos. CN 201760230 and CN 101402019 do not comprise a centrally arranged venturi nozzle.

Desired even or symmetrical distribution of separated particles with respect to the constriction section is made possible by arranging the vertical end section of the return channel annularly around the centrally arranged venturi nozzle. By releasing the recycled particles symmetrically with respect of the constriction section, it is possible to distribute the recycled particles evenly to the reaction chamber. When the constriction section comprises multiple venturies, the present invention provides the ability to distribute the recycled particles evenly to all the ventures. Even distribution of particles is very important for the efficiency of the reactions taking place in the reaction chamber.

Even distribution of particles to the reaction chamber is especially important because the recycled particles typically also comprise unreacted reagent. In some applications of the present invention, the reaction of the reagent with the pollutant compounds may be far from complete during a single pass through the scrubber. In such a case, it is important to recycle a relatively large portion of the material collected by the particle separator in order to obtain a high utilization rate of the reagent.

Usually, the reagent is introduced directly to the reaction chamber. Then, however, multiple feeding points may be needed to guarantee even distribution of the reagent. It is also possible to introduce the reagent, or a portion of the reagent, through the return channel, i.e., the return channel may comprise means for introducing particulate reagent to the stream of recycled particles. When the reagent is introduced to the scrubber through the return channel, it is naturally especially important that the recycled particles are evenly distributed to the vertical gas stream.

According to the present invention, the vertical end section may direct the recycled particles down towards a central zone of the inlet chamber. In many cases, however, the mixing of the recycled particles with the upwards flowing gas stream is more efficient if the direction of the particles is not directly downwards, but the velocity also has a horizontal component.

In case the constriction section comprises only a single venturi nozzle, the lower end of the vertical end section advantageously comprises multiple openings, which cause to the recycled particles a horizontal momentum towards the vertical axis of symmetry. Thus, the openings of the lower end of the vertical end section are, or the bottom of the lower end section is, advantageously designed so as to throw the particles towards the center of the mainly vertical gas stream.

On the other hand, if the constriction section comprises multiple venturi nozzles arranged circumferentially around the centrally arranged venturi nozzle, the recycled particles are advantageously affected by a horizontal momentum outwards, i.e., away from the vertical axis of symmetry of the constriction section. Thereby, the recycled particles can be distributed evenly to the vertical gas streams entering to the multiple venturi nozzles. This is advantageously made by arranging a dispersion piece below the lower end of the vertical end section, which dispersion piece has an upper surface of which bounces the recycled particles outwards.

Preferably, the dispersion piece comprises an upwards directed right circular cone having an aperture of sixty to one hundred twenty degrees, preferably, of eighty to one hundred degrees. When the recycled particles hit the upper surface of the cone, they spread circularly around the dispersion piece so as to efficiently interact with the upward flowing gas streams.

A further important feature of the present invention is that the particles are released to a gas stream that has a relatively high velocity and high temperature. Typically, a gas stream entering the inlet chamber has a temperature of 100-250° C., preferably, 130-160° C. Correspondingly, according to the present invention, the recycled particles are distributed in the inlet chamber (58) in a location in which the temperature of the gas stream is at least 100° C. Thereby, the recycled particles, which have been humidified and cooled down in the reaction chamber, are efficiently and rapidly dried and heated with the hot gas stream while re-entering the constriction section. It has been noticed that such initial drying and heating minimizes harmful effects, such as agglomeration due to CaCl, which may take place in a conventional scrubber. The present construction should be compared with a conventional construction disclosed, for example, in International Publication No. WO 2005/030368, in which the particles are released to a downstream portion of the constriction section. In such a conventional construction, the particles are almost immediately mixed with the particle bed in the reaction chamber, having typically a temperature of 65-85° C., which is about 10° C. to 40° C. above the water and acid condensation temperatures, causing a risk of the harmful effects mentioned above. The injection location according to the present invention has also proved to be advantageous for mercury reduction by using suitable adsorbents, for example, carbon particles.

According to the present invention, the recycled particles are released adjacent to the lower end of the centrally arranged venturi nozzle. Thereby, the releasing location is at a top portion of the inlet chamber or at a lower portion of the constriction section, and not at a center or lower portion of the inlet chamber. Typically, the gas has a velocity of about 10 m/s at the center portions of the inlet chamber, but it may be as high as 60 m/s in the constriction section. According to the present invention, the lower end of the vertical end section is at a location that is so close to the lower end of the constriction section that the gas stream already has a streamlined, well-defined flow velocity upwards, towards the constriction section. According to the invention, the recycled particles are preferably released in a location in which the vertical velocity of the gas is at least 20 m/s, even more preferably, at least 30 m/s.

The recycled particles are advantageously hit with a high velocity vertical gas stream in a nearly counter-current flow that renders a very efficient heat transfer from the vertical gas stream to the recycled particles possible. The vertical gas stream also efficiently entrains a fine fraction of the recycled particles to the constriction section and to the reaction chamber. On the other hand, a coarse fraction of the recycled particles, the particles of which are too heavy to be entrained with the gas stream, is separated and sinks to the bottom of the inlet chamber.

A further advantage of releasing recycled particles according to the present invention is achieved when feeding carbon particles, such as lignite coke particles, through the return channel as a reagent to remove, e.g., mercury pollutants. By the present arrangement, the carbon particles are caused to have head-on collisions with $SO_2$ and $SO_3$, and possible sulfur acid molecules, before removing the sulfur oxides in the reaction chamber. Thereby, the sulfur molecules further activate the carbon particles and the pollutant removal is improved.

The inlet chamber may generally be of different shapes and sizes. It can be a separate chamber at the end of a gas channel or multiple gas channels, or it can be just an end section of a gas channel in which the direction of the gas stream is changed from mainly horizontal to vertical. A discharge duct for discharging separated coarse particles from the scrubber is connected at the bottom of the inlet chamber.

The return channel may be a single channel, but, according to an advantageous embodiment of the present invention, the return channel comprises, or the downstream end of the return channel is divided into, multiple in-parallel connected pipe sections, which pipe sections are connected to the vertical end section. The pipe sections may comprise only two pipes, which are connected at different angles to the vertical end section, preferably, to opposite sides of the end section. According to an especially advantageous embodiment of the present invention, the return channel comprises more than two pipe sections in flow connection with the vertical end section. Preferably, the pipe sections are connected in rotational symmetry with the vertical end section. Such a construction is especially advantageous when the constriction section comprises multiple circumferentially arranged venturies and the pipe sections are arranged between the venturies.

Even distribution of recycled particles to the reaction chamber depends on the entrainment of particles with the gas stream. Therefore, in order to achieve a desired distribution, it is also important that the velocity of the gas stream in the region where the recycled particles contact with the gas stream is even. In order to have such a desired gas velocity, it is, in some cases, advantageous that the system does not have only a single gas channel for introducing the gas stream to the inlet chamber, but there are multiple gas channels connected to the inlet chamber. There may preferably be two gas channels connected to opposite sides of the inlet chamber, but even more preferably, there are more than two gas channels connected in rotational symmetry with the inlet chamber.

A main feature of the present invention is that a coarse fraction of the recycled particles can be advantageously separated. Separation of coarse particles from the recycled particles and not allowing them to enter into the reaction chamber is especially important because the pollutant reducing efficiency of coarse particles is lower than that of fine particles due to their generally lower reagent content and their lower area-to-volume ratio. The adverse effect of coarse particles is especially enhanced due to their tendency to accumulate into the particle bed of the reaction chamber.

According to an embodiment of the present invention, the shares of particles being separated and entrained with the vertical gas stream, respectively, can be controlled by adjusting the vertical position of a dispersion piece. Therefore, the dispersion piece is advantageously connected to a lifting mechanism for controlling the vertical position of the dispersion piece.

In case the dispersion piece comprises an upwards directed circular cone, the dispersion piece may alternatively, or additionally, comprise means for controlling the aperture of the cone. Thereby, the horizontal momentum caused to the particles can be increased by increasing the aperture of the cone.

The above brief description, as well as further objects, features, and advantages of the present invention will be more fully appreciated by reference to the following detailed description of the currently preferred, but nonetheless illustrative, embodiments in accordance with the present invention, when taken in conjunction with the accompanying drawings.

DETAILED DESCRIPTION OF THE INVENTION

Figure 1:
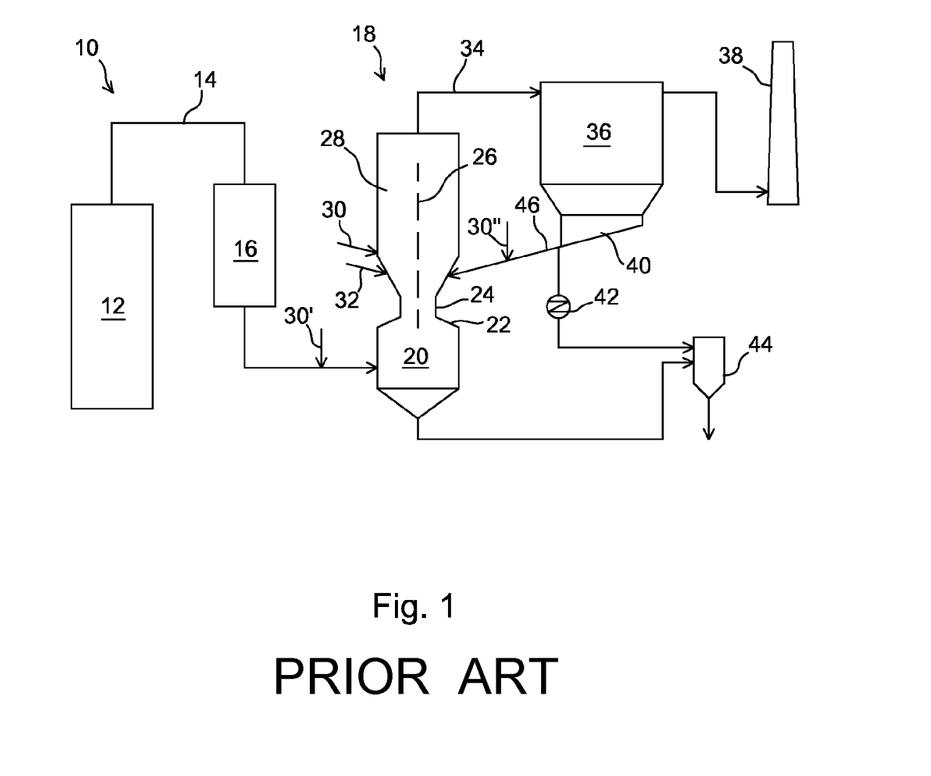
FIG. 1 shows the schematic diagram of a boiler with a dry CFB scrubber according to prior art.

The schematic diagram of FIG. 1 shows a boiler (10) comprising a furnace (12) and an exhaust gas channel (14) with a heat recovery area (HRA) (16). The exhaust gas channel (14) is connected downstream of the HRA (16) to a conventional dry CFB scrubber (18) for removing pollutant compounds, such as sulfur oxides, from the exhaust gas. The temperature of the exhaust gas entering into the scrubber (18), i.e., the temperature downstream of the HRA (16), is typically about 150° C.

Conventional dry CFB scrubbers, as well as dry CFB scrubbers according to present invention, can be used in connection with any types of boilers, such as CFB boilers or PC boilers, or with many other types of plants, such as cement kilns, glass furnaces, and waste incineration plants. It is a common feature to the plants that they all produce a stream of exhaust gas comprising similar pollutant compounds, such as $SO_2$, $SO_3$, HCl, HF, dioxins, furans, and heavy metals, including Hg.

The dry CFB scrubber (18) shown in FIG. 1 comprises an inlet chamber (20) arranged at a lower portion of the scrubber (18) for directing the exhaust gas stream upwards to form a vertical gas stream. The inlet chamber (20) may be an actual separate chamber or it may be, for example, a curved end section of the exhaust gas channel (14). It is also possible that there are two or even more than two exhaust gas channels (14) leading to a single inlet chamber. Such multiple exhaust gas channels may convey exhaust gas either from a single plant or from multiple separate plants.

Above and in flow connection with an upper end (22) of the inlet chamber (20) is arranged a vertical constriction section (24), actually, a venturi nozzle, for accelerating the vertical gas stream. The constriction section (24), which is symmetrical about a vertical axis (26), renders it possible to maintain a fluidized bed in a vertical reaction chamber (28) arranged above and in flow connection with the constriction section (24).

The reaction chamber (28) comprises conventional feeding means (30), such as a lance or a feeding screw, for introducing reagent, such as calcium hydroxide, $Ca(OH)_2$, to the reaction chamber (28) for converting pollutant compounds in the exhaust gas to harmless compounds, i.e., reaction products of the scrubber (18), such as $CaSO_4$. The reagent can alternatively be introduced into the scrubber (18), for example, by using feeding means (30') connected to the exhaust gas channel (14) upstream of the scrubber (18). In order to facilitate the conversion of the pollutant compounds to the reaction products, the reaction chamber (28) usually also comprises means (32), such as one or more nozzles, for feeding water to the reaction chamber (28) for humidifying and cooling down the fluidized bed forming into the reaction chamber.

A discharge channel (34) is connected in the upper portion of the reaction chamber (28) for discharging gas and particles, including the reaction products and possible unreacted reagent, from the reaction chamber (28) to a particle separator (36). The particle separator (36) is usually a fabric filter, but in some cases, it may alternatively be another type of separator, for example, an electrostatic precipitator. Particles, including the reaction products and unreacted reagent, are separated from the exhaust gas in the particle separator (36), and the remaining cleaned exhaust gas is directed through a stack (38) to the environment.

The particles separated in the particle separator (36) are collected to a collecting device (40), such as a series of bottom hoppers, at the bottom of the particle separator (36). A portion of the separated particles, the share of which can be controlled by a particle flow controlling device (42), is directed to a silo (44) to be removed from the system. In order to maintain a particle bed in the reaction chamber (28), and also because the separated particles may still contain a considerable portion of unreacted reagent, another portion of the separated particles is continuously recycled through a return channel (46) back to the reaction chamber (28). The return channel (46) may also comprise reagent feeding means (30"), to be used alternatively or in addition to the reagent feeding means (30) described above.

According to the conventional construction shown in FIG. 1, the return channel (46) is connected to the side of an upper portion of the constriction section (24). Alternatively, it can be connected directly to a lower portion of the reaction chamber (28). It has, however, been found that such arrangements for connecting the return channel may, in some applications, lead to harmful effects, such as fouling, agglomeration and coarsening of the bed in the reaction chamber (28).

According to another conventional construction, the return channel is connected to the side of the inlet chamber (20) (not shown in FIG. 1). This, however, has the disadvantage that it may be necessary to add to the stream of exhaust gas a stream of recirculated gas (not shown in FIG. 1) in the inlet chamber to maintain a gas velocity that is needed to entrain a sufficient amount of recycled particles to the reaction chamber, especially at low loads.

Figure 2:
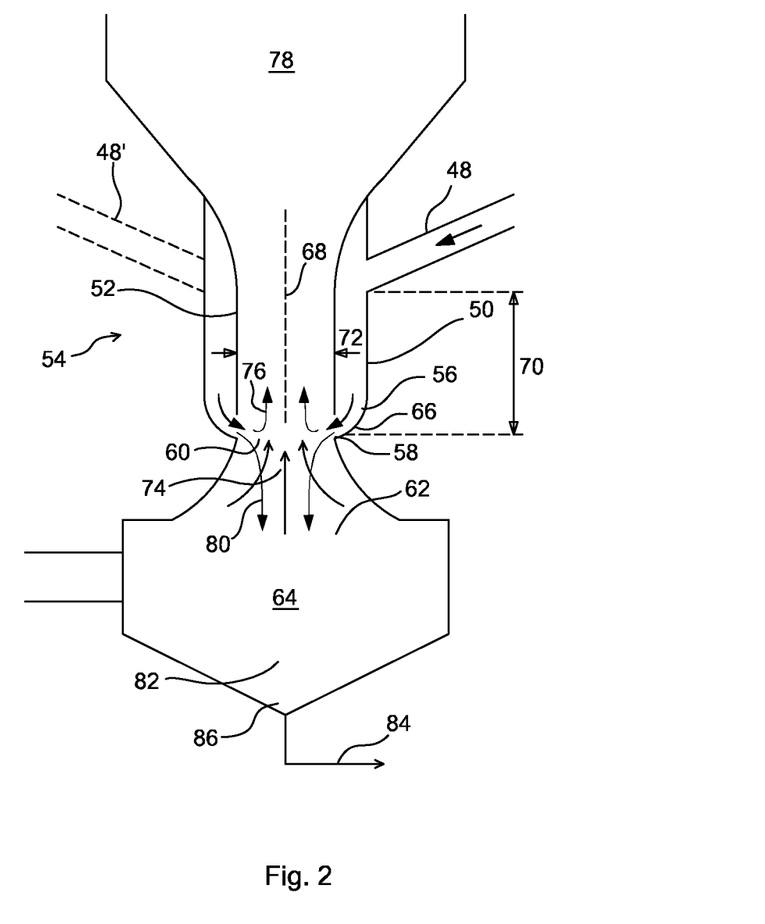
FIG. 2 shows the schematic diagram of a detail of a scrubber according to a first embodiment of the present invention.

The schematic diagram of FIG. 2 shows an embodiment of the present invention, including a modified arrangement for returning particles from the particle separator (36) back to the reaction chamber (28). As an especially advantageous feature, the return channel (48) shown in FIG. 2 comprises a vertical end section (50) that is arranged annularly around a sole, centrally arranged venturi nozzle (52) of the constriction section (54). A lower end (56) of the vertical end section (50) comprises multiple openings (58) to an upstream portion (60) of the venturi nozzle (52) so as to allow the recycled particles to flow towards the upper end (62) of the inlet chamber (64). The lower end (56) of the vertical end section (50) advantageously comprises a sloped bottom (66) leading to the openings (58) for causing a horizontal momentum to the recycled particles and to thereby direct the recycled particles through the openings (58) inwards, towards the axis of symmetry (68) of the constriction section (54).

In order to distribute the recycled particles evenly to the constriction section, the number of openings (58) is preferably at least three, more preferably, at least four, and most preferably, at least six. Even distribution of particles to the openings (58) is improved when the vertical end section (50) has a sufficient height (70). Preferably, the height is at least as large as the minimum width (72) of the constriction section. The distribution of particles can also be improved by having multiple return channels (48, 48'), or at least end sections of the return channels, so called pipe sections, connected to the vertical end section (50). The number of return channels or pipe sections is preferably at least two, even more preferably, at least three or four, and most preferably, at least six.

The recycled particles encounter a vertical high velocity gas stream (74) flowing from the inlet chamber (64) towards the constriction section (54). A fine fraction (76) of the recycled particles is entrained with the vertical gas stream to a reaction chamber (78) above the constriction section. At the same time, a coarse fraction (80) of the recycled particles, which is not entrained with the vertical gas stream, sinks to a lower portion (82) of the inlet chamber. The coarse fraction is advantageously discharged through a discharge duct (84) from a bottom hopper (86) of the inlet chamber to a silo.

In FIG. 2, the vertical end section of the return channel is arranged annularly immediately around the constriction section by having a portion of the outer wall of the venturi nozzle as the inner wall of the vertical end section. The embodiment of FIG. 3 differs from that shown in FIG. 2 only in that the vertical end section (50) is spaced from the venturi nozzle (52). Thereby, the lower end (56) of the vertical end section and the openings (58) are at a lower level than in the embodiment shown in FIG. 2, and the separated particles are released at a lower level and further away from the axis of symmetry (68) of the constriction section. This has the effect that the particles are hit by a gas stream (74), which has a somewhat lower velocity than the arrangement shown in FIG. 2. Thereby, a portion of intermediate size particles, which would be entrained by the gas flow in the embodiment of FIG. 2, are separated and fall to the bottom of the inlet chamber (64), in the embodiment of FIG. 3.

Figure 4:
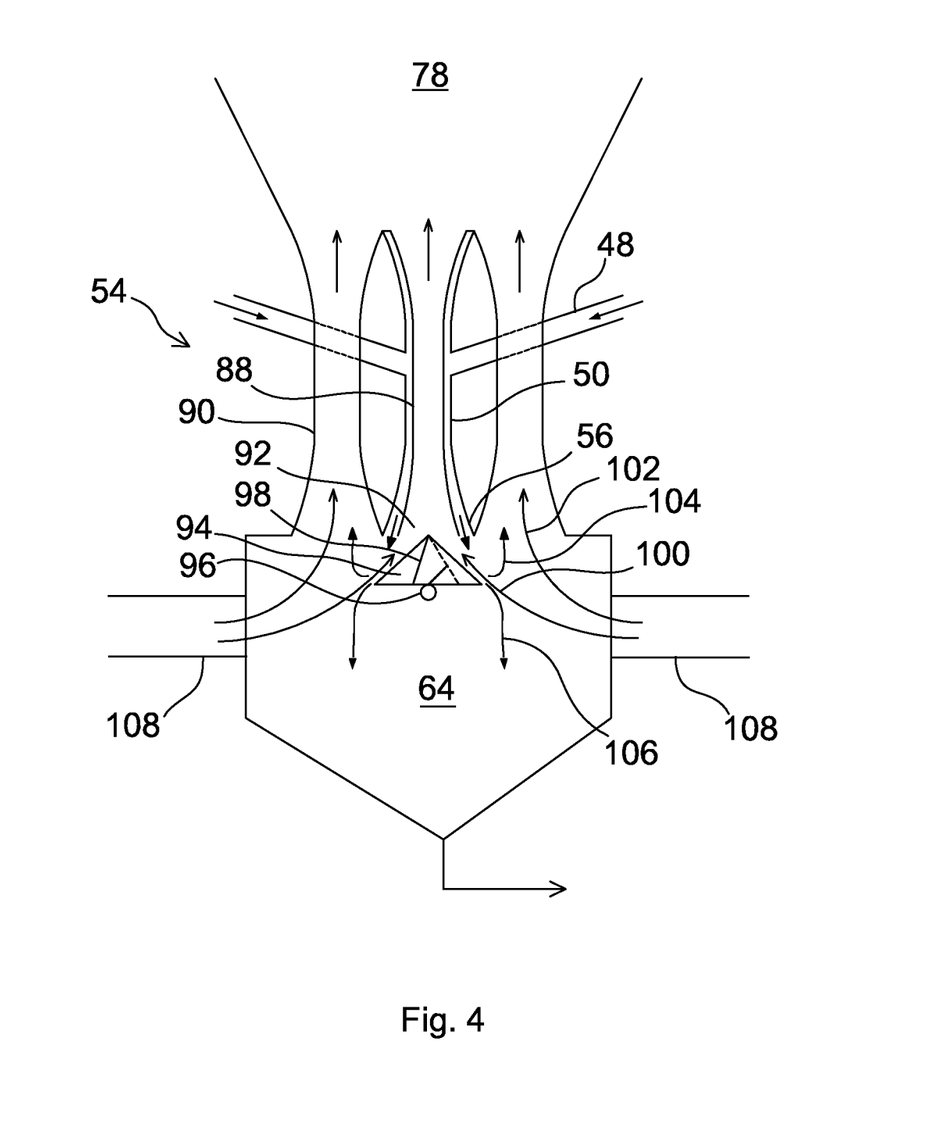
FIG. 4 shows the schematic diagram of a detail of a scrubber according to a third embodiment of the present invention.

FIG. 4 shows a third embodiment of the present invention, which is applicable in dry CFB scrubbers having a constriction section (54) with a centrally arranged venturi nozzle (88) surrounded by multiple circumferentially arranged venturi nozzles (90). It would be possible to return recycled particles from a return channel (48) into such a scrubber with a vertical end section arranged annularly around centrally arranged venturi nozzle in the same way as above, for example, as in the arrangement shown in FIG. 2. In such a construction, however, most of the entrained particles would be guided to the reaction chamber through the central venturi nozzle, and the distribution of the particles to the reaction chamber (78) would not be ideal.

Therefore, FIG. 4 shows another construction in which most of the recycled particles are distributed evenly to the multiple circumferentially arranged venturi nozzles (90). This is made possible by extending the vertical end section (50) of the return channel (48) annularly to the vicinity of the lower end (92) of the central venturi nozzle (88) and by arranging a dispersion piece (94) below the lower end (56) of the vertical end section (50) so as to cause an outwards directed horizontal momentum to the recycled particles.

The dispersion piece (94) advantageously comprises an upwards directed right circular cone having an aperture of sixty to one hundred twenty degrees, preferably, of eighty to one hundred degrees. According to an advantageous embodiment of the present invention, the dispersion piece is connected to a lifting mechanism (96), whereby the vertical position of the dispersion piece can be adjusted. When the dispersion piece is raised higher, the recycled particles hit the upper surface of the dispersion piece at a higher level and encounter a higher velocity gas stream, and more particles will be entrained by the vertical gas streams. Thus, by adjusting the vertical position of the dispersion piece, it is possible to control the portion of particles to be separated to the bottom of the inlet chamber to be removed from the scrubber.

The dispersion piece may alternatively, or additionally, comprise a construction (98) having an adjustable upper surface with a front portion partially overlapping the end portion and means for adjusting the amount of overlapping, or other suitable construction that enables controlling of the aperture of the cone. By increasing the aperture, the horizontal momentum caused to the particles is increased.

When using the construction of FIG. 4, the recycled particles released from the lower end (56) of the vertical end section (50) of the return channel (48) first encounter a gas stream (100) directed to the central venturi nozzle (88). Because the centrally directed gas stream (100) is usually relatively small, only a small portion of the recycled particles, consisting mainly of smallest particles, is entrained with the gas stream to the central venturi nozzle (88) and through the central venturi nozzle to the reaction chamber (78). A major portion of the other particles falls down, hits the upper surface of the dispersion piece (94) and bounces outwards. When these particles are then affected by vertical gas streams (102) flowing towards the circumferentially arranged venturi nozzles (90), a finer portion (104) of the particles is entrained with the vertical gas streams through the circumferentially arranged venturi nozzles (90) to the reaction chamber (78) and a coarser portion (106) of the particles sinks to the bottom of the inlet chamber.

Figure 3:
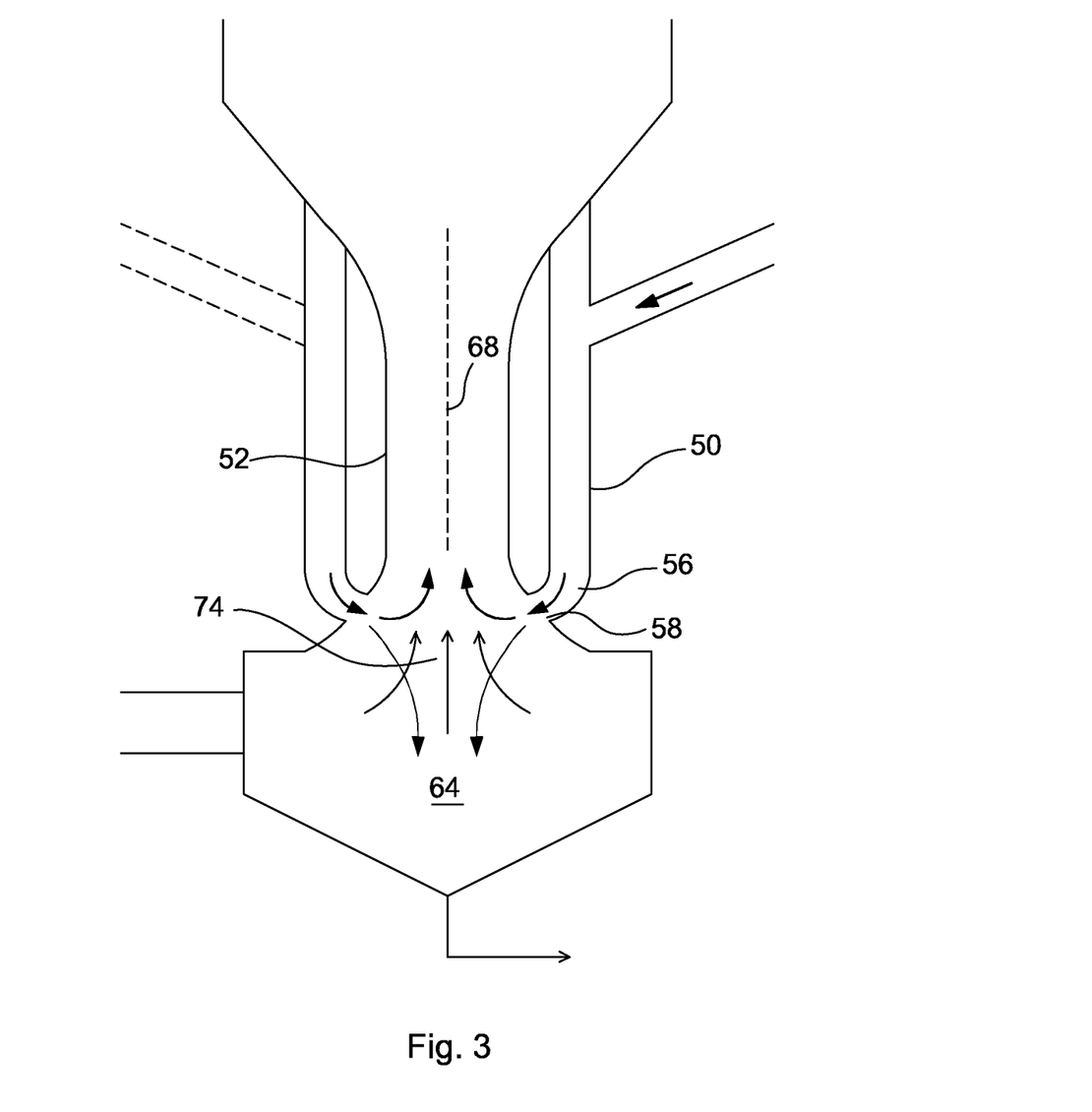
FIG. 3 shows the schematic diagram of a detail of a scrubber according to a second embodiment of the present invention.

Advantageously, in the embodiment shown in FIG. 4, as well as in the embodiments shown in FIGS. 2 and 3, the return channel (48) may comprise multiple in-parallel connected pipe sections in flow connection with the vertical end section (50). In the embodiment of FIG. 4, the multiple in-parallel connected pipe sections are advantageously arranged symmetrically between the multiple circumferentially arranged venturi nozzles (90).

The embodiment of FIG. 4 shows two gas channels (108) for introducing the pollutant laden gas to the inlet chamber (64). Generally, the number of gas channels can be one or two, or even higher than two, such as three or four. Multiple gas channels provide the advantage that the distribution of gas in the inlet chamber is relatively even. Thereby, the vertical gas streams directing to the individual circumferentially arranged venturi nozzles (90) are nearly identical, and evenness of the distribution of recycled particles to the circumferential venturi nozzles is improved. Two or more gas channels can also be used in the embodiments of FIGS. 2 and 3, including only a single venturi, in order to improve the evenness of the particle distribution in the single venturi.

While the invention has been described herein by way of examples in connection with what are at present considered to be the most preferred embodiments, it is to be understood that the invention is not limited to the disclosed embodi-

The invention claimed is:

1. A scrubber for removing pollutant compounds from a gas stream, the scrubber comprising:
   at least one gas channel for introducing the gas stream to a lower portion of the scrubber;
   an inlet chamber at the lower portion of the scrubber for directing the gas stream upwards to form a vertical gas stream;
   a constriction section having a vertical axis of symmetry and comprising a centrally arranged venturi nozzle, the constriction section being above and in flow connection with an upper end of the inlet chamber for accelerating the vertical gas stream;
   a reaction chamber arranged above and in flow connection with the constriction section;
   means for introducing at least one reagent to the reaction chamber for converting pollutant compounds in the gas stream to reaction products;
   a discharge channel in flow connection with the reaction chamber for discharging gas and particles including the reaction products from the reaction chamber;
   a particle separator in flow connection with the discharge channel for separating particles including the reaction products from the gas;
   a return channel for continuously recycling a portion of the separated particles from the particle separator to the reaction chamber, wherein the return channel comprises a vertical end section arranged annularly around the centrally arranged venturi nozzle, a lower end of the vertical end section being in flow connection with the inlet chamber so as to distribute recycled particles evenly to a zone adjacent to the lower end of the centrally arranged venturi nozzle to entrain a fine fraction of the recycled particles with the vertical gas stream and to separate a coarse fraction of the recycled particles to a lower portion of the inlet chamber; and
   a discharge duct being connected at a bottom of the inlet chamber for discharging separated coarse particles from the scrubber.

2. A scrubber according to claim 1, further comprising means for causing a horizontal momentum to the recycled particles arranged adjacent to the lower end of the vertical end section.

3. A scrubber according to claim 2, wherein the constriction section comprises a single venturi nozzle, and the lower end of the vertical end section comprises a sloped bottom leading to multiple openings from the lower end of the vertical end section to an upstream portion of the single venturi nozzle for causing a horizontal momentum towards the vertical axis of symmetry to the recycled particles.

4. A scrubber according to claim 2, wherein the constriction section comprises multiple venturi nozzles arranged circumferentially around the centrally arranged venturi nozzle, and below the lower end of the vertical end section, connected a dispersion piece for causing a horizontal momentum away from the vertical axis of symmetry to the recycled particles.

5. A scrubber according to claim 4, further comprising a lifting mechanism for adjusting the vertical position of the dispersion piece.

6. A scrubber according to claim 4, wherein the dispersion piece comprises an upwards directed circular cone having an aperture of sixty to one hundred twenty degrees.

7. A scrubber according to claim 6, wherein the dispersion piece comprises a construction for controlling the aperture of the circular cone.

8. A scrubber according to claim 4, wherein the dispersion piece comprises an upwards directed circular cone having an aperture of eighty to one hundred degrees.

9. A scrubber according to claim 8, wherein the dispersion piece comprises a construction for controlling the aperture of the circular cone.

10. A scrubber according to claim 1, wherein the return channel comprises multiple in-parallel connected pipe sections in flow connection with the vertical end section.

11. A scrubber according to claim 1, wherein multiple gas channels are connected with the inlet chamber.

12. A scrubber according to claim 1, wherein the return channel comprises means for introducing at least one particulate reagent for converting the pollutant compounds to reaction products.

13. A method of removing pollutant compounds from a gas stream in a scrubber, the method comprising the steps of:
    introducing the gas stream through at least one gas channel to an inlet chamber at a lower portion of the scrubber;
    directing the gas stream upwards in the inlet chamber to form a vertical gas stream;
    accelerating the vertical gas stream in a constriction section arranged above and in flow connection with the inlet chamber, the constriction section having a vertical axis of symmetry and comprising a centrally arranged venturi nozzle;
    conveying the gas stream from the constriction section to a reaction chamber arranged above the constriction section;
    introducing at least one reagent to the reaction chamber for converting the pollutant compounds to particulate reaction products;
    discharging gas and particles including the reaction products through a discharge channel from the reaction chamber to a particle separator;
    separating particles including the reaction products from the gas in the particle separator;
    recycling a portion of the separated particles from the particle separator through a return channel to the reaction camber; and
    distributing the recycled particles evenly through a vertical end section of the return channel arranged annularly around the centrally arranged venturi nozzle to a zone adjacent to the lower end of the centrally arranged venturi nozzle to entrain a fine fraction of the recycled particles with the vertical gas stream and to separate a coarse fraction of the recycled particles to a lower portion of the inlet chamber.

14. A method of removing pollutant compounds from a gas stream according to claim 13, further comprising causing a horizontal momentum to the separated particles.

15. A method of removing pollutant compounds from a gas stream according to claim 14, wherein the constriction section comprises a single venturi nozzle and further comprising causing a horizontal momentum to the separated particles towards the vertical axis of symmetry by a sloped bottom of the lower end vertical end section leading to multiple openings from the lower end of the vertical end section to an upstream portion of the single venturi nozzle.

16. A method of removing pollutant compounds from a gas stream according to claim 14, wherein the constriction section comprises multiple venturi nozzles arranged circumferentially around the centrally arranged venturi nozzle and further comprising causing a horizontal momentum to the separated particles away from the vertical axis of symmetry by a dispersion piece connected centrally below the lower end of the vertical end section.

17. A method of removing pollutant compounds from a gas stream according to claim 13, further comprising distributing the recycled particles adjacent to the lower end of the centrally arranged venturi nozzle in a location in which the temperature of the gas stream is at least 100° C. and the vertical design velocity of the gas stream is at least 20 m/s.

18. A method of removing pollutant compounds from a gas stream according to claim 13, further comprising distributing the recycled particles adjacent to the lower end of the centrally arranged venturi nozzle in a location in which the temperature of the gas stream is at least 100° C. and the vertical design velocity of the gas stream is at least 30 m/s.

* * * * *